United States Patent
Munoz et al.

(10) Patent No.: US 10,331,894 B2
(45) Date of Patent: Jun. 25, 2019

(54) STATIC PROGRAM ANALYSIS IN AN OBJECT-RELATIONAL MAPPING FRAMEWORK

(71) Applicant: ENTIT SOFTWARE LLC, Sanford, NC (US)

(72) Inventors: Alvaro Munoz, Las Rozas (ES); Yekaterina Tsipenyuk O'Neil, Sunnyvale, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 76 days.

(21) Appl. No.: 15/500,532

(22) PCT Filed: Aug. 29, 2014

(86) PCT No.: PCT/US2014/053444
§ 371 (c)(1),
(2) Date: Jan. 31, 2017

(87) PCT Pub. No.: WO2016/032516
PCT Pub. Date: Mar. 3, 2016

(65) Prior Publication Data
US 2017/0220807 A1    Aug. 3, 2017

(51) Int. Cl.
*G06F 21/00* (2013.01)
*G06F 21/57* (2013.01)
(Continued)

(52) U.S. Cl.
CPC ............. *G06F 21/577* (2013.01); *G06F 8/75* (2013.01); *G06F 11/3604* (2013.01); *G06F 16/289* (2019.01); *G06F 2221/033* (2013.01)

(58) Field of Classification Search
CPC .... G06F 8/75; G06F 21/577; G06F 17/30607; G06F 11/3604; G06F 2221/033
See application file for complete search history.

(56) References Cited

U.S. PATENT DOCUMENTS

| 7,779,399 B2 | 8/2010 | Huang et al. |
| 2007/0240138 A1 | 10/2007 | Chess et al. |

(Continued)

OTHER PUBLICATIONS

Tom Joad, NPL Dec. 2013 (obtained from IDS submitted on May 24, 2018) (Year: 2013).*

(Continued)

*Primary Examiner* — Tri M Tran (57) ABSTRACT

Example implementations relate to static program analysis. For example, an apparatus includes a processor to perform static program analysis on a set of processor executable instructions associated with an object-relational mapping (ORM) framework. The first set of processor executable instructions includes an object. The processor is also to generate a propagation path of the object based on an execution flow of the object. The propagation path includes a first node and a second node. The first node corresponds to a first ORM operation to store the object in a database. The second node corresponds to a second ORM operation to retrieve the object from the database. The second node is linked to the first node based on a common attribute of the object. In response to a determination that the propagation path includes a sink, the processor is to output a security risk warning.

20 Claims, 4 Drawing Sheets

(51) Int. Cl.
   *G06F 8/75*    (2018.01)
   *G06F 11/36*   (2006.01)
   *G06F 16/28*   (2019.01)

(56) References Cited

U.S. PATENT DOCUMENTS

2010/0287214 A1    11/2010  Narasayya et al.
2012/0266247 A1*   10/2012  Guy .................. G06F 21/577
                                                          726/25
2014/0047538 A1     2/2014  Scott et al.
2014/0090068 A1     3/2014  Guarnieri et al.
2014/0130153 A1     5/2014  Dolby et al.
2014/0173741 A1     6/2014  Gluck et al.
2014/0208428 A1     7/2014  Guarnieri et al.

OTHER PUBLICATIONS

Kiezun, et al., "Automatic Creation of SQL Injection and Cross-Site Scripting Attacks", Sep. 10, 2008, Computer Science and Artificial Intelligence Lab. Technical Report, 13 pgs.
Liu, Z., et al., "User Behavior Identification for Trust Management in Pervasive Computing Systems", 2007, FTDCS'07, IEEE Computer Society, 8 pages.
Dahse, et al., "Static Detection of Second-Order Vulnerabilities in Web Applications", 23rd USENIX Security Symposium, San Diego, CA, USA, Aug. 2014, 15 pages.
European Patent Office, Extended European Search Report for Appl. No. 14900493.9-1224 I 3186723 PCT/US2014053444 dated Mar. 15, 2018 (11 pages).
Tom Joad et al.: "Easy way tostore Java objects to MySQL?—Stack Overflow," Dec. 27, 2013 (2 pages).

* cited by examiner

STATIC PROGRAM ANALYSIS IN AN OBJECT-RELATIONAL MAPPING FRAMEWORK

BACKGROUND

Static program analysis is a technique for finding security vulnerabilities in processor executable instructions of an application without executing the processor executable instructions. Examples of security vulnerabilities include susceptibility to cross-site scripting and susceptibility to code injection.

BRIEF DESCRIPTION OF THE DRAWINGS

Some examples of the present application are described with respect to the following figures.

DETAILED DESCRIPTION

As described above, static program analysis is a technique for finding security vulnerabilities in source code of an application without executing the source code. As used herein, source code may be processor executable instructions. As an example, source code may include processor executable instructions written in JAVA or C++. An example of static program analysis may be taint analysis. During a taint analysis operation, a static program analyzer (e.g., processor executable instructions that performs the taint analysis operation) may emulate an execution flow of a user-controlled object from a source to a sink. An object may be a data structure that includes a variable, a function, another data structure, or a combination thereof. A source may correspond to a block of code where the user-controlled object enters the source code. A sink may correspond to a block of code with potential vulnerability. The emulated execution flow may be displayed as a propagation path including a plurality of nodes.

However, when the source code includes blocks of code written in a database programming language, such as structured query language (SQL), and when the user-controlled object is stored in a database and subsequently retrieved from the database using the blocks of code, an execution flow of the user-controlled object while the user-controlled object is stored in the database may not be emulated as the static program analyzer may not have the capability to perform a semantic analysis of the blocks of code written in SQL. Thus, a full propagation path from a source to a sink may not be generated.

Examples described herein enable a generation of a full propagation path by providing a static program analyzer that emulates a full execution flow of a user-controlled object from a source to a sink via a database. For example, a static program analyzer, implemented using processor executable instruction, may identify an object from a set of processor executable instructions associated with an object-relational mapping (ORM) framework as a source. The static program analyzer may also identify a first ORM operation to modify the object in a database (e.g., a WRITE operation) and may identify a second ORM operation to retrieve the object from the database (e.g., a READ operation). The static program analyzer may further link the first ORM operation to the second ORM operation based on an attribute of the object. The static program analyzer may further identify a sink associated with the object.

The static program analyzer may further generate a propagation path of the object using the source, the first ORM operation, the second ORM operation, and the sink. The first ORM operation may correspond to a first node in the propagation path. The second ORM operation may correspond to a second node in the propagation path immediate subsequent to the first node. Thus, a full propagation path of an object that involves a database operation may be generated. In this manner, examples described herein may increase a likelihood and/or an accuracy of identifying a security vulnerability in source code.

Figure 1:
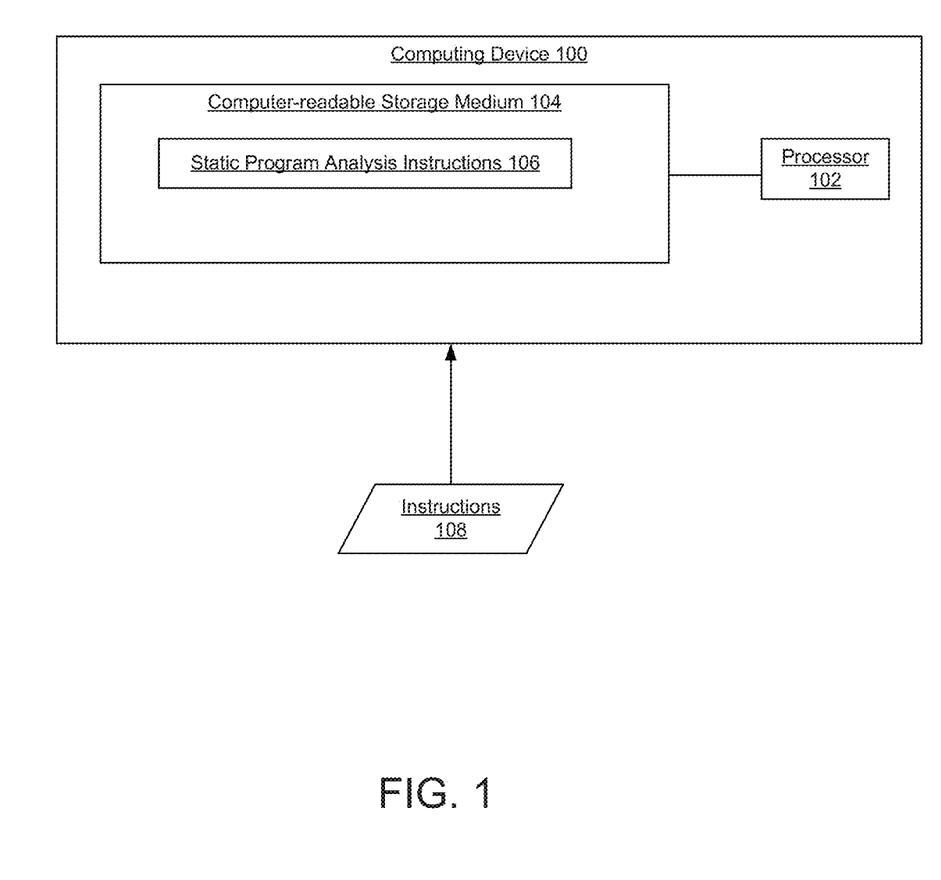
FIG. 1 is a block diagram of a computing device to perform static program analysis on a set of processor executable instructions associated with an object-relational mapping framework, according to an example.

Referring now to the figures, FIG. 1 is a block diagram of a computing device 100 to perform static program analysis on a set of processor executable instructions associated with an object-relational mapping (ORM) framework, according to an example. Computing device 100, for example, may be a web-based server computer, a local area network server computer, a cloud-based server computer, a notebook computer, a desktop computer, an all-in-one system, a tablet computing device, a mobile phone, or any other electronic device suitable for performing static program analysis on a set of processor executable instructions associated with an ORM framework. Computing device 100 may include a processor 102 and a computer-readable storage medium 104.

Processor 102 may be a central processing unit (CPU), a semiconductor-based microprocessor, and/or other hardware devices suitable for retrieval and execution of instructions stored in computer-readable storage medium 104. Processor 102 may fetch, decode, and execute static program analysis instructions 106 to perform static program analysis on a set of processor executable instructions. At least one processor can be used to process processor executable instructions.

Computer-readable storage medium 104 may be any electronic, magnetic, optical, or other physical storage device that contains or stores executable instructions. Thus, computer-readable storage medium 104 may be, for example, Random Access Memory (RAM), an Electrically Erasable Programmable Read-Only Memory (EEPROM), a storage device, an optical disc, etc. In some examples, computer-readable storage medium 104 may be a non-transitory storage medium, where the term "non-transitory" does not encompass transitory propagating signals. As described in detail below, computer-readable storage medium 104 may be encoded with static program analysis instructions 106 for performing static program analysis on a set of processor executable instructions associated with an ORM framework.

During operation, static program analysis instructions 106 may perform static program analysis, such as a taint analysis, on instructions 108. Static program analysis instructions 106 may perform the static program analysis independent of an execution of instructions 108. That is the static program analysis is performed without executing instruction 108.

Instructions 108 may be a set of processor executable instructions, such as source code, associated with an ORM framework. As used herein, an ORM framework may be a programming technique that enables data manipulations in a relational database without the use of a database programming language, such as structured query language (SQL). An example of an ORM framework may be Hibernate ORM. Another example of an ORM framework may be QuickDB ORM.

To utilize an ORM framework, an object type may be defined using a class. The object type may include at least one property. A table in a database that stores an object of the object type may also be defined. As used herein, an object may include a variable, a function, a data structure, or a combination thereof. A configuration file may be used to map the object type to the table. For example, an object type "Employee" may be defined using a class. Objects of the "Employee" object type are to be stored in an Employee table in a database. The "Employee" object type may include a first property "name," a second property "age," and a third property "salary." In a configuration file, the first property "name" may be mapped to a first column in the Employee table, the second property "age" may be mapped to a second column in the Employee table, and the third property "salary" may be mapped to a third column in the Employee table. Each object of the "Employee" object type may be mapped to a row in the Employee table. When an object of the "Employee" object type is to be stored to the database or to be retrieved from the database in source code, ORM framework specific methods may be used. Thus, the use of database programming language may be avoided.

Example source code that stores an object of the "Employee" object type to a database and retrieves the object from the database using an ORM framework is described in more detail in Table 1. The example source code may be an example of instructions 108 that is subject to static program analysis performed by static program analysis instructions 106.

TABLE 1

1. Employee employee = new Employee(name, age, salary);
2. Integer employeeID = (Integer) session.save(employee); // store the object
3. employee = (Employee)session.get(Employee.class, employeeID); // retrieve the object
4. System.out.print ("Employee info:" + employee.getInfo(employeeID)); // display employee info
5. System.out.print ("Name:" + employee.getName(employeeID, name); // display employee name
6. System.out.print ("Salary:" + employee.getSalary (employeeID, salary); // display employee salary In line 1 of Table 1, an object of the object type "Employee" may be instantiated. The object may be identified via an identifier "emp." The object "employee" may have particular values assigned to the three properties: "name," "age," and "salary" during the instantiation. In line 2 of Table 1, the object "employee" is stored in a row in the Employee table in a database using a first ORM operation "session.save." The first ORM operation may correspond to a function that stores or modifies an object in a database. The row may be identified by a row identifier "employeeID". In line 3 of Table 1, the object "employee" is retrieved from the Employee table using a second ORM operation "session.get" via the row identifier "employeeID." The second ORM operation may correspond to a function that retrieves an object from a database. In line 4 of Table 1, values of properties "name," "age," and "salary" of the object "employee" are displayed. In line 5 of Table 1, value of "name" is displayed. In line 6 of Table 1, value of "salary" is displayed.

When a static program analyzer, for example, implemented using static program analysis instructions 106 performs static program analysis on example source code in Table 1, the static program analyzer may identify line 1 of Table 1 as a source as the object "employee" is instantiated. During instantiation, the object "employee" is introduced to the source code by having values assigned to at least one property of the object "employee". The values may be assigned by an entity external to the source code, such as a user or another set of processor executable instructions. Thus, the object "employee" may be a user-controlled object.

The static program analyzer may identify ORM operations associated with the object "employee" based on the object type (i.e., Employee), the identifier of the object "employee" in the database (i.e., employeeID), or a combination thereof. For example, the static program analyzer may identify the first ORM operation "session.save" as an ORM operation that stores the object "employee" to a database based on an identifier of the first ORM operation (i.e., "save") and based on the identifier of the object "employee", the object type of the object "employee," the row identifier of the object "employee," or a combination thereof.

The static program analyzer may identify the second ORM operation "session.get" as an ORM operation that retrieves the object "employee" from the database based on an identifier of the second ORM operation (i.e., "get") and based on the row identifier of the object "employee", the object type of the object "employee," or a combination thereof. The static program analyzer may link the first ORM operation to the second ORM operation based on a common attribute of the object "employee" found in both of the ORM operations. The common attribute may include the row identifier (i.e., "employeeID") of the object "employee," the object type of the object "employee," or a combination thereof.

The static program analyzer may identify line 4 of Table 1 as a sink as values of properties of the object "employee" are displayed. In response to a determination that the object "employee" is utilized in a sink, the static program analyzer may generate a full propagation path of the object "employee" and output a security risk warning so that a programmer of the source code may update or rewrite the source code to remove any potential security vulnerabilities. An example full propagation path is described in more detail with reference to FIG. 3.

In some examples, the static program analyzer may track the execution flow of a property of an object, such as "salary" of the object "employee" using the object type of the object having the property, the object type of the property, an identifier of the property, a row identifier of the property, or a combination thereof. Thus, static program analyzer may generate a full propagation path of the property. For example, when the property "name" contains tainted data, such as during instantiation "Employee emp=new Employee(name)," the static program analyzer may identify line 5 of Table 1 as a second sink that is associated with the property "name". Thus, the static program analyzer may generate a propagation path of the property "name." As another example, the static program analyzer may identify line 6 of Table 1 as a third sink that is associated with the property "salary" when the property "salary" contains tainted data. Thus, the static program analyzer may generate a propagation path of the property "salary." It should be understood that a set of processor executable instructions may include any number of sinks.

Figure 2:
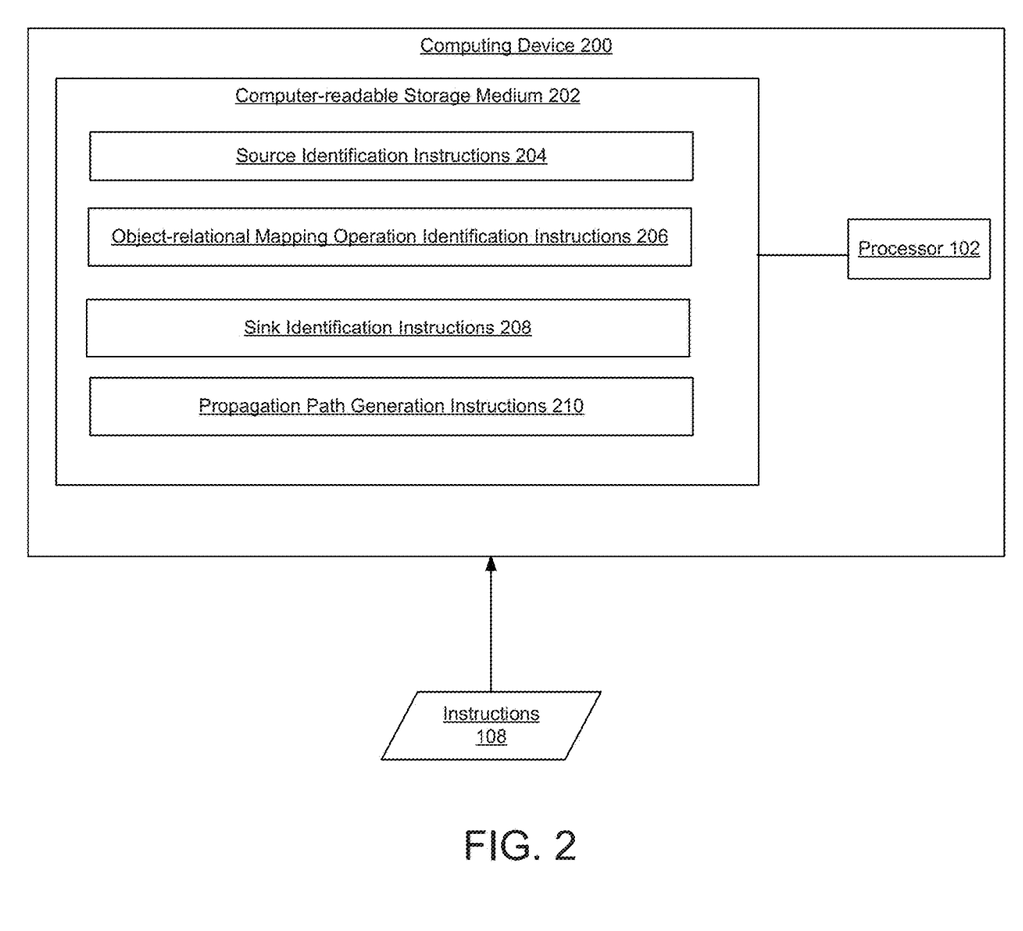
FIG. 2 is a block diagram of a computing device to perform static program analysis on a set of processor executable instructions associated with an object-relational mapping framework, according to an example.

FIG. 2 is a block diagram of a computing device 200 to perform static program analysis on a set of processor executable instructions associated with an object-relational mapping framework, according to an example. Computing device 200 may be similar to computing device 100 of FIG. 1. Computing device 200 may include processor 102 and a computer-readable storage medium 202 that is similar to computer-readable storage medium 104.

Computer-readable storage medium 104 may be encoded with a series of processor executable instructions 204-210 to perform static program analysis on a set of processor executable instructions, such as instructions 108.

Source identification instructions 204 may identify a user-controlled object in instructions 108 as a source. For example, source identification instructions 204 may identify the object "employee" or a property of the object "employee" in line 1 of Table 1 as a source.

Object-relational mapping operation identification instructions 206 may identify ORM operations that stores or modifies data in database and ORM operations that retrieves the data from the database. For example, object-relational mapping operation identification instructions 206 may identify the first ORM operation and the second ORM operation as ORM operations that interact with an object or a property of the object using the database.

Sink identification instructions 208 may identify a sink associated with an object or a property of the object. For example, sink identification instructions 208 may identify line 4, line 5, and/or line 6 of Table 1 as a sink. Propagation path generation instructions 210 may generate a propagation path of an object or a property of the object based on a source, an ORM operation that modifies the object or the property in a database, an ORM operation that retrieves the object or the property from the database, and a sink associated with the object or the property.

Figure 3:
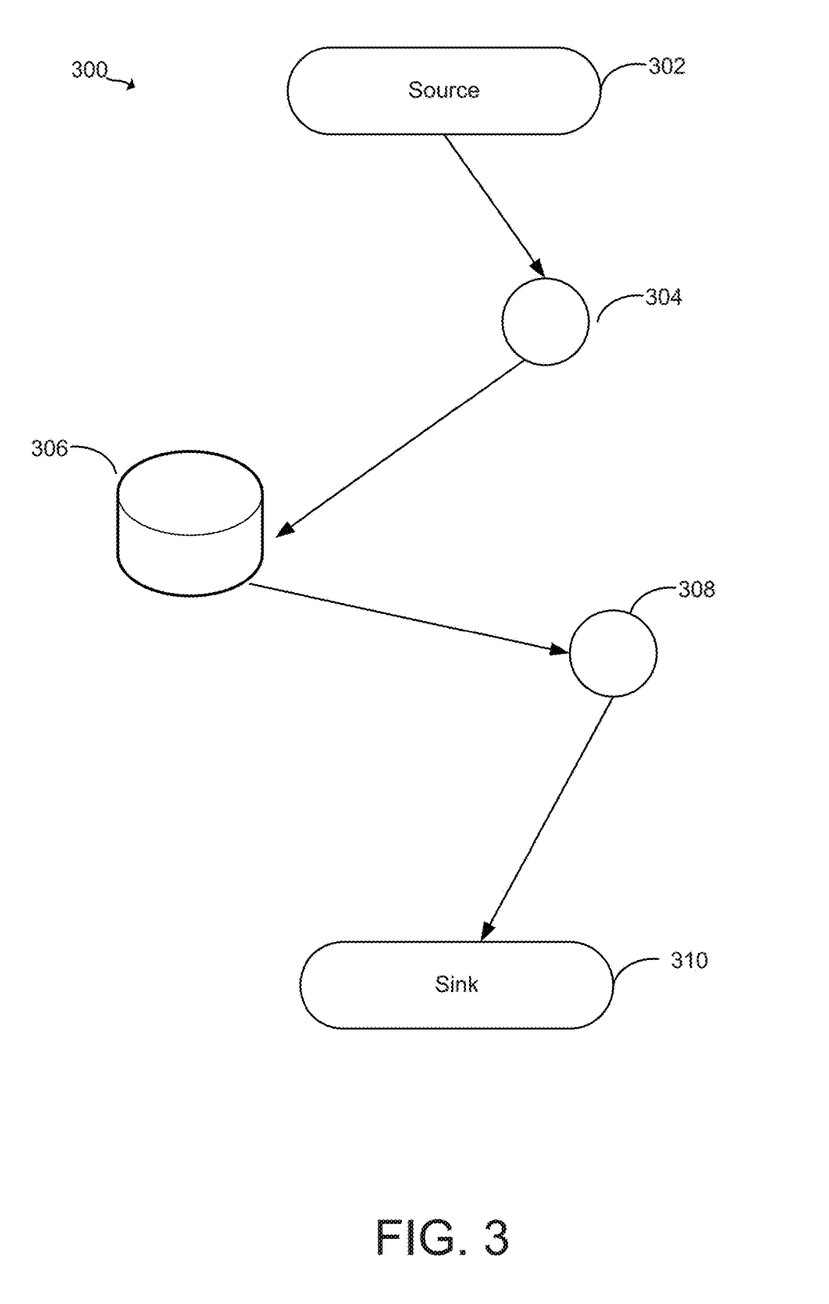
FIG. 3 is a propagation path of an object or a property of an object of a set of processor instructions associated with an object-relational mapping framework, according to an example.

FIG. 3 is a propagation path 300 of an object or a property of an object of a set of processor instructions associated with an object-relational mapping framework, according to an example. Propagation path 300 may be generated using computing device 100 of FIG. 1 and/or computing device 200 of FIG. 2.

Propagation path 300 may include a source node 302, a plurality of intermediate nodes 304, 308, and a sink node 310. Propagation path 300 may correspond to a visual representation of an execution flow of an object or a property of an object within a set of source code. Propagation path 300 may indicate that an execution flow of the object or the property starts at source node 302. The execution flow then travels through intermediate node 304, a database 306, intermediate node 308, and ends at sink node 310. Although two intermediate nodes are shown in FIG. 3, it should be understood that a propagation path may include any number of intermediate nodes. An intermediate node may correspond to a block of code that interacts with an object or a property of an object that is identified as a source. Source node 302 may correspond to the source code in line 1 of Table 1. Intermediate node 304 may be a database entry node indicating that an object or a property of an object is to be stored or modified in database 306. As an example, intermediate node 304 may correspond to the source code in line 2 of Table 1.

Intermediate node 308 may be a database exit node indicating that the object or the property stored or modified in the database in intermediate node 304 is to be retrieved from the database. Thus, intermediate node 308 may be a node that is immediately subsequent or consecutive to intermediate node 304. As an example, intermediate node 308 may correspond to the source code in line 3 of Table 1. Sink node 310 may correspond to the source code in line 4, line 5, or line 6 of Table 1. Thus, using propagation path 300, a programmer may remediate any potential security vulnerabilities in the source code, such as instructions 108 of FIGS. 1-2, by updating or changing source code in the appropriate code blocks as identified in propagation path 300.

Figure 4:
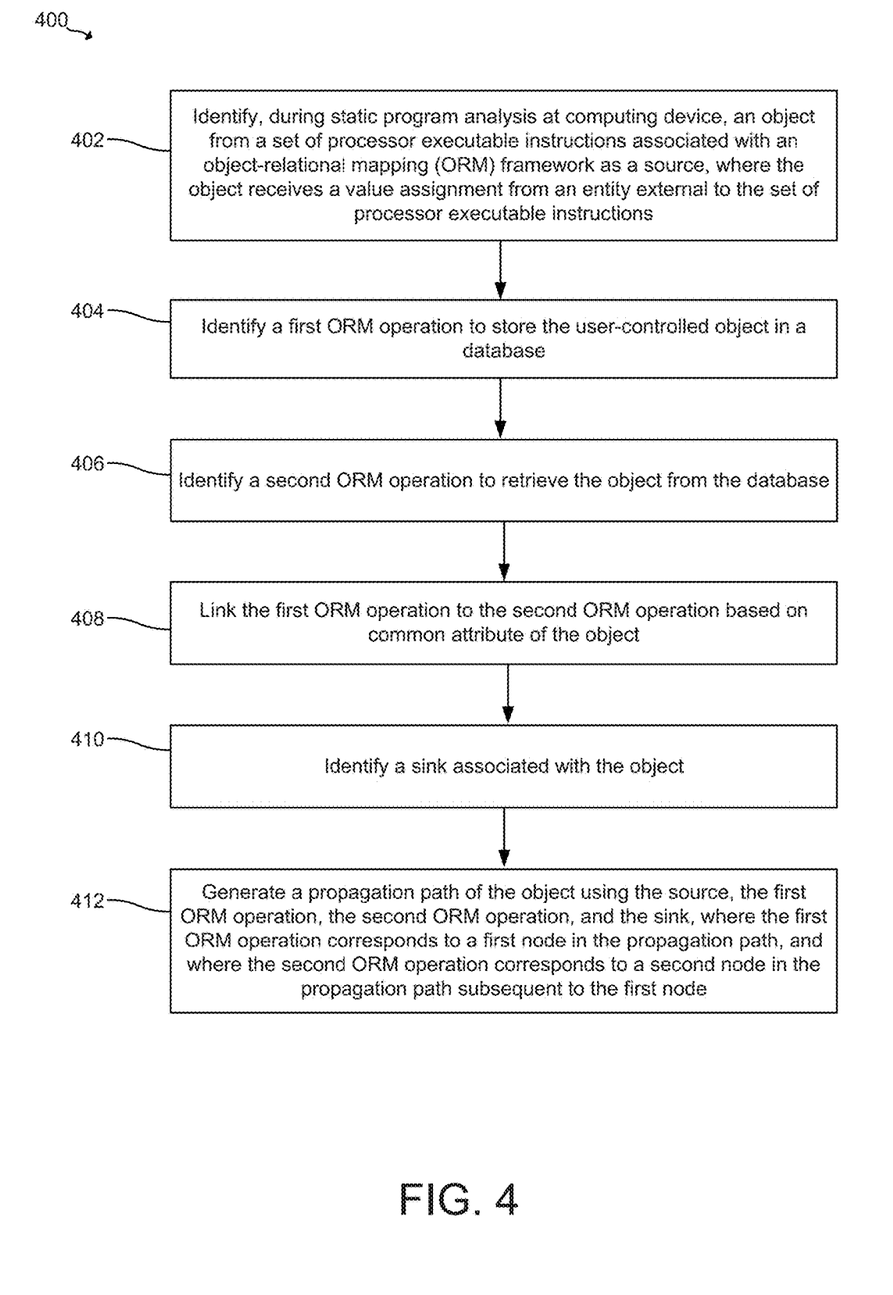
FIG. 4 is a flowchart illustrating a method of performing static program analysis on a set of processor executable instructions associated with an object-relational mapping framework, according to an example.

FIG. 4 is a flowchart illustrating a method 400 of performing static program analysis on a set of processor executable instructions associated with an object-relational mapping framework, according to an example. Method 400 may be implemented using computing device 100 of FIG. 1 and/or computing device 200 of FIG. 2. Method 400 includes identifying, at computing device, an object from a set of processor executable instructions associated with an object relational mapping (ORM) framework as a source, where the object receives a value assignment from a source external to the set of processor executable instructions, at 402. For example, referring to FIG. 1, the static program analyzer may identify line 1 of Table 1 as a source as the object "employee" is instantiated.

Method 400 also includes identifying a first ORM operation to store the user-controlled object in a database, at 404. For example, referring to FIG. 1, the static program analyzer may identify the first ORM operation "session.save" as an ORM operation that stores the object "employee" to a database based on an identifier of the first ORM operation (i.e., "save") and based on the row identifier of the object "employee", the object type of the object "employee," or a combination thereof.

Method 400 further includes identifying a second ORM operation to retrieve the object from the database, at 406. For example, referring to FIG. 1, the static program analyzer may identify the second ORM operation "session.get" as an ORM operation that retrieves the object "employee" from the database based on an identifier of the second ORM operation (i.e., "get") and based on the row identifier of the object "employee", the object type of the object "employee," or a combination thereof.

Method 400 further includes linking the first ORM operation to the second ORM operation based on common attribute of the object, at 408. For example, referring to FIG. 1, the static program analyzer may link the first ORM operation to the second ORM operation based on a common attribute of the object "employee" found in both of the ORM operations. The common attribute may include the row identifier (i.e., "employeeID") of the object "employee," the object type of the object "employee," or a combination thereof.

Method 400 further includes identifying a sink associated with the object, at 410. For example, referring to FIG. 1, the static program analyzer may identify line 4 of Table 1 as a sink as values of properties of the object "employee" are displayed.

Method 400 further includes generating a propagation path of the object using the source, the first ORM operation, the second ORM operation, and the sink, where the first ORM operation corresponds to a first node in the propagation path, and where the second ORM operation corresponds to a second node in the propagation path subsequent to the first node, at 412. For example, referring to FIG. 1, in response to a determination that the object "employee" is utilized in a sink, the static program analyzer may generate a full propagation path of the object "employee" and output a security risk warning so that a programmer of the source code may update or rewrite the source code to remove any potential security vulnerabilities.

The use of "comprising", "including" or "having" are synonymous and variations thereof herein are meant to be inclusive or open-ended and do not exclude additional unrecited elements or method steps.

What is claimed is:

1. An apparatus comprising:
  a processor; and
  a non-transitory storage medium storing machine-readable instructions executable on the processor to:
    perform static program analysis on a set of processor executable instructions associated with an object-relational mapping (ORM) framework, wherein the set of processor executable instructions includes an object;
    generate a propagation path of the object based on an execution flow of the object, wherein the propagation path includes a first node and a second node, wherein the first node corresponds to a first ORM operation to store the object in a database, wherein the second node corresponds to a second ORM operation to retrieve the object from the database, and wherein the second node is linked in the propagation path to the first node based on the first ORM operation and the second ORM operation being associated with a common attribute of the object, the common attribute comprising an attribute of a relational table of the database; and
    in response to a determination that the propagation path includes a sink, output a security risk warning to cause an update of the set of processor executable instructions.

2. The apparatus of claim 1, wherein the second node is subsequent to the first node in the propagation path.

3. The apparatus of claim 1, wherein an object type of the object is associated with the relational table in the database.

4. The apparatus of claim 1, wherein the attribute of the relational table includes a row identifier of the object, the row identifier identifying a row in the relational table.

5. The apparatus of claim 1, wherein the first node and the second node are consecutive nodes in the propagation path.

6. The apparatus of claim 1, wherein the common attribute further comprises an object type of the object.

7. The apparatus of claim 1, wherein the database is a relational database, and wherein the ORM framework enables data manipulations in the relational database without use of a database programming language.

8. The apparatus of claim 1, wherein the database is a relational database, and wherein the ORM framework enables data manipulations in the relational database without use of a structured query language (SQL).

9. The apparatus of claim 1, wherein the propagation path further comprises a first intermediate node and a second intermediate node between the first node and the second node, the first intermediate node being a database entry node indicating that the object or a property of the object is stored or modified in the database, and the second intermediate node being a database exit node indicating that the object or a property of the object is retrieved from the database.

10. A non-transitory computer-readable storage medium comprising instructions that when executed cause a computing device to:

identify, during static program analysis, an object from a set of processor executable instructions associated with an object-relational mapping (ORM) framework as a source;
  identify, in the set of processor executable instructions, a first ORM operation to modify the object in a database based on an identifier of the first ORM operation;
  identify, in the set of processor executable instructions, a second ORM operation to retrieve the object from the database based on an identifier of the second ORM operation;
  in response to a determination that the first ORM operation and the second ORM operation include a common relational table attribute of the object, link the first ORM operation to the second ORM operation;
  identify a sink associated with the object; and
  in response to identifying the sink:
    generate a propagation path of the object using the source, the first ORM operation, the second ORM operation, the linking of the first ORM operation and the second ORM operation, and the sink, wherein the first ORM operation corresponds to a first node in the propagation path, and wherein the second ORM operation corresponds to a second node in the propagation path, and
    output a security risk warning to cause an update of the set of processor executable instructions.

11. The non-transitory computer-readable storage medium of claim 10, wherein the common relational table attribute includes a row identifier of the object, the row identifier identifying a row of a relational table of the database.

12. The non-transitory computer-readable storage medium of claim 10, wherein the propagation path is generated independent of an execution of the set of processor executable instructions at the computing device.

13. The non-transitory computer-readable storage medium of claim 10, wherein an object type of the object is associated with a relational table in the database.

14. The non-transitory computer-readable storage medium of claim 10, wherein the object is a user-controlled object.

15. The non-transitory computer-readable storage medium of claim 10, wherein the propagation path further comprises a first intermediate node and a second intermediate node between the first node and the second node, the first intermediate node being a database entry node indicating that the object is stored or modified in the database, and the second intermediate node being a database exit node indicating that the object is retrieved from the database.

16. A method performed by a system comprising a hardware processor, comprising:
  identifying, during static program analysis at computing device, an object from a set of processor executable instructions associated with an object-relational mapping (ORM) framework as a source, wherein the object receives a value assignment from an entity external to the set of processor executable instructions;
  identifying, in the set of processor executable instructions, a first ORM operation to store the object in a database;
  identifying, in the set of processor executable instructions, a second ORM operation to retrieve the object from the database;
  linking the first ORM operation to the second ORM operation based on determining that a common attribute of the object is in the first ORM operation and the second ORM operation, the common attribute comprising an attribute of a relational table of the database;

identifying a sink associated with the object; and in response to identifying the sink:

generating a propagation path of the object using the source, the first ORM operation, the second ORM operation, the linking of the first ORM operation and the second ORM operation, and the sink, wherein the first ORM operation corresponds to a first node in the propagation path, and wherein the second ORM operation corresponds to a second node in the propagation path subsequent to the first node; and outputting a security risk warning to cause an update of the set of processor executable instructions.

17. The method of claim 16, further comprising:

identifying a second sink associated with a first property of the object;

generating a propagation path of the first property using the source, the first ORM operation, the second ORM operation, and the second sink;

identifying a third sink associated with a second property of the object that is different from the first property; and generating a propagation path of the second property using the source, the first ORM operation, the second ORM operation, and the second sink.

18. The method of claim 16, wherein the propagation path is generated independent of an execution of the set of processor executable instructions at the computing device.

19. The method of claim 16, wherein the propagation path is generated based on a taint analysis operation on the set of processor executable instructions.

20. The method of claim 16, wherein the propagation path further comprises a first intermediate node and a second intermediate node between the first node and the second node, the first intermediate node being a database entry node indicating that the object is stored or modified in the database, and the second intermediate node being a database exit node indicating that the object is retrieved from the database.

* * * * *